Nov. 25, 1969  B. L. THORNSEN ET AL  3,480,849
DIRECT CURRENT MOTOR CONTROLLER
Filed March 30, 1967  2 Sheets-Sheet 1

BERNARD L. THORNSEN.
ROBERT S. HENRICH
LEO F. MAYER.
INVENTORS

BY Robert C. Smith
ATTORNEY.

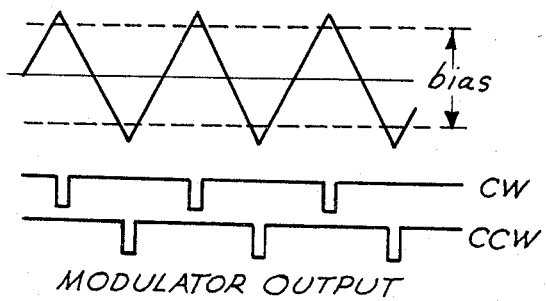
FIG. 3 (a)
FIG. 3 (b)
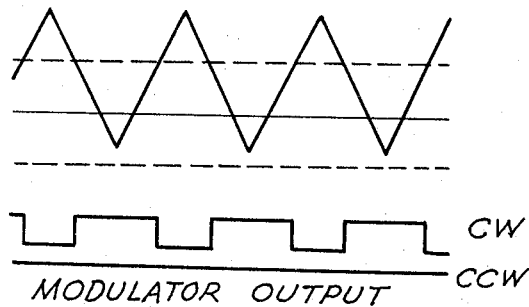
FIG. 4 (a)
FIG. 4 (b)
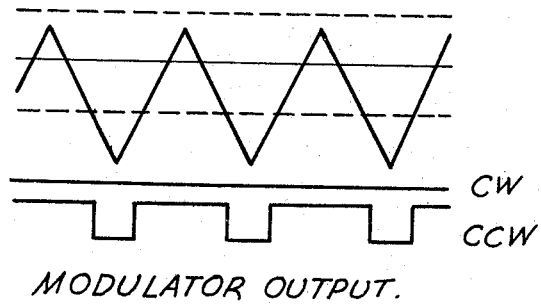
FIG. 5 (a)
FIG. 5 (b)

United States Patent Office 3,480,849
Patented Nov. 25, 1969

3,480,849
DIRECT CURRENT MOTOR CONTROLLER
Bernard L. Thornsen, Osceola, Robert S. Henrich, South Bend, and Leo F. Mayer, Bremen, Ind., assignors to The Bendix Corporation, a corporation of Delaware
Filed Mar. 30, 1967, Ser. No. 627,093
Int. Cl. H02p 5/16
U.S. Cl. 318—257
8 Claims

ABSTRACT OF THE DISCLOSURE

Apparatus for controlling a reversible direct current motor from a single voltage source such that it may be rotated in either direction. The motor winding is connected into a bridge circuit with semiconductor switching elements which provide that the full supply voltage is available for starting or braking in each direction. A time modulation generator receives input signals from a triangular wave generator and a direct current input source to control polarity and pulse duration of the input to the bridge circuit to control the semiconductor switching elements.

BACKGROUND OF THE INVENTION

This invention relates to an electronic controller for a reversible direct current electric motor including semiconductor means for controlling the direction of current flow through the exciting winding of said motor.

In many control applications it is desired to use a reversible direct current motor which is powered from a single D.C. source such as a battery. In airborne applications it is desirable that neither the motor nor the battery be any heavier than necessary, so a premium is placed on getting the best possible performance from the motor and from the battery. It is conventional practice to connect the motor across a bridge circuit with the power source connected across the opposite terminals of the bridge such that the entire battery voltage is impressed upon the motor winding in either direction. Conventionally, this requires switching means so that the battery can be physically disconnected from the motor and reconnected across the motor in the opposite polarity.

If the motor is to be as small and light as possible and have a minimum response time, it is necessary that the starting and/or braking torque available at the time of reversal of direction be as high as possible. Furthermore, the motors used in such applications are often permanent magnet motors, and it is necessary to protect the permanent magnets from being subjected to demagnetizing fields when reversals in direction are required. There is a need, therefore, for a control system for a D.C. motor which will permit precise control of the motor voltage in either direction through the use of a single power source without requiring the use of mechanical switches. This control system should permit the maximum starting and/or braking torque of which the motor is capable in either direction, despite numerous reversals in the polarity of the input signal.

The control system should be operable from a single power source wherein said motor is connected in a closed loop system with its direction of rotation and speed of rotation being proportional to the polarity and magnitude, respectively, of a direct current control or error signal.

Applicants have devised a motor control system in which the exciting winding of the controlled direct current motor is connected in a bridge circuit with semiconductor switching means which are capable of reversing the direction of current through the winding and also of substantially discharging to ground any residual electric charge which might otherwise result in magnetic effects which would have to be overcome upon reversal. Because of this feature, maximum starting and braking torque is available for each reversal. This feature also causes the armature of the motor to be held in position at null since any residual electrical charges which would tend to cause drifting of the motor are conducted to ground.

A time modulation generator is connected to the bridge circuit and supplies pulses of varying duration to one side or the other depending upon the magnitude and the polarity of its input signal. The direct current input signal is compared with the output from a triangular wave generator such that input signals of one polarity cause output pulses in one channel and input signals of the opposite polarity cause output pulses in the opposite channel. The channels are connected to the separated inputs of the bridge circuit and include logic means to positively prevent output signals from both channels simultaneously.

BRIEF DESCRIPTION OF THE DRAWINGS

FIGURE 3(a) is a graph showing the triangular wave output of the oscillator and the manner in which the modulator is biased with no input control signal;

FIGURE 3(b) is a graph showing the modulator output signal with no input control signal;

FIGURES 4(a) and 4(b) are graphs similar to FIGURES 3(a) and 3(b), showing the manner in which a clockwise control signal affects the bias and the modulator output; and FIGURES 5(a) and 5(b) are graphs similar to FIGURES 3(a) and 3(b) showing the manner in which a counterclockwise control signal affects the bias and the modulator output.

DESCRIPTION OF THE PREFERRED EMBODIMENT

Figure 1:
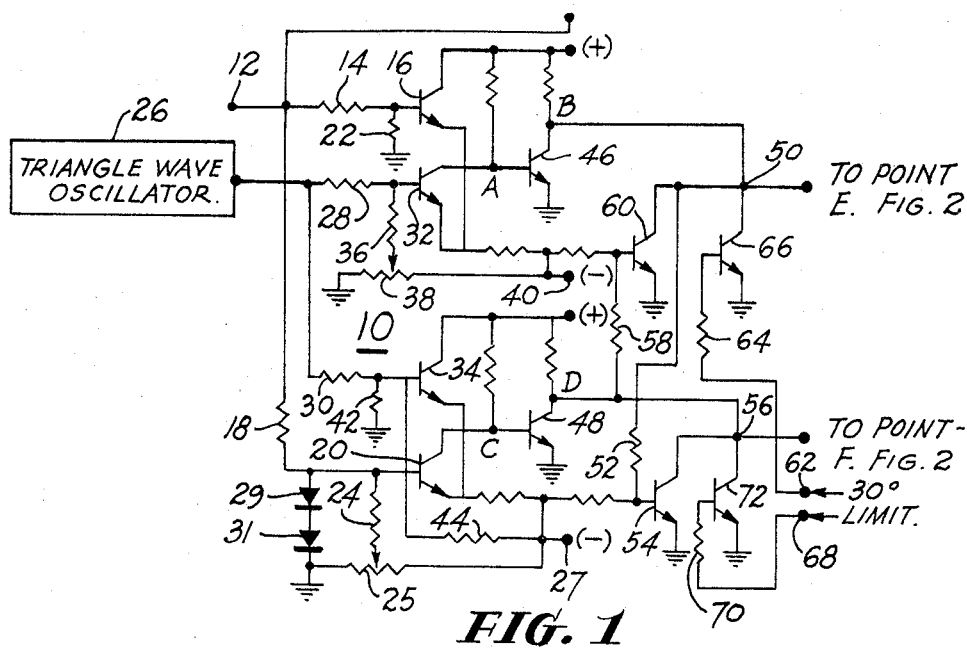
FIGURE 1 is a schematic drawing showing the time modulation generator including the logic portions of our motor control system.

Referring to FIGURE 1, the time modulation generator shown generally at numeral 10 has an input terminal 12 to which a direct current control signal of either polarity is connected. This control signal is connected through a resistor 14 to the base electrode of a transistor 16 and through a resistor 18 to the base of a transistor 20. Resistors 22 and 24 serve as base bias resistors for each of transistors 16 and 20 respectively. Resistor 24 is connected to the slider of a potentiometer 25 which is connected between ground and a negative voltage source at terminal 27. A pair of diodes 29, 31 connected between the base of transistor 20 and ground provide a protectoin for the circuit operation, since transistor 20 must not produce outputs for positive inputs. Diodes 29 and 31 restrict the polarity of the input to meet this requirement.

A triangular wave oscillator 26, which is of conventional design, provides an input through resistors 28 and 30 to the bases of transistors 32 and 34, respectively. The base of transistor 32 is connected to a biasing circuit consisting of a resistor 36 connected to the slider of a potentiometer 38 connected between ground and a negative voltage source at a terminal 40. The base of transistor 34 is connected to a bias resistor 42 and through a resistor 44 of relatively high value to the negative voltage source at terminal 27 which may be at the same potential as that at terminal 40. Potentiometer 38 provides an adjustment for the bias on the base of transistor 32, and this bias is normally set such that the transistor 32 conducts just below the positive peak of the triangular wave input, thereby producing a short output pulse. Similarly, potentiometer 25 permits adjustment of the bias on the base of transistor 20 such that conduction occurs just short of the negative peak of the triangular wave from oscillator 26. This characteristic is shown in FIGURE 3 where FIGURE 3(a) shows the triangular wave output with the bias level superimposed (dotted). In FIGURE 3(b) the short pulses appearing at times corresponding with the positive and negative voltage peaks show the outputs appearing at the collector electrodes of transistors 32 and 20, respectively. Thus transistor 32 conducts on positive peaks and transistor 20 conducts on negative peaks.

Input signals applied to terminal 12 are normally direct current signals of varying magnitude and of either polarity. These input signals, connected to transistors 16 and 20, whose emitters are connected to the emitter circuits of transistors 32 and 34, shift the bias threshold voltages up or down relative to the triangular wave input as shown in FIGURES 4(a) and (b) and FIGURES 5(a) and (b). In FIGURE 4(a) a direct current input of such polarity as to produce a clockwise bias effectively shifts the bias thresholds downward relative to the triangular wave, causing conduction by one channel of the time modulation generator of a series of longer duration negative pulses corresponding to clockwise rotation of the motor and no conduction of pulses of the opposite polarity, as shown in FIGURE 4(b). The opposite input polarity produces the result depicted in FIGURES 5(a) and (b) where a direct current input signal of such polarity as to cause counterclockwise rotation of the motor effectively raises the bias threshold relative to the triangular input wave, thus cutting off any clockwise pulses and increasing the duration of the counterclockwise negative pulses.

Any signals appearing at junctions A and C are then connected to the bases of transistors 46 and 48, respectively. These transistors operate as limiter amplifiers such that the output waveforms appearing at points B and D are positive rectangular pulses. This preserves the proportionality between the magnitude of the direct current input signal and the duration of the output pulses from the time modulation generator 10. It is these rectangular pulses which appear at the output terminals and which are supplied to points E and F at the input to the actuator power switch of FIGURE 2.

For reasons which are discussed below, it is necessary to provide a very positive means to eliminate simultaneous outputs from both channels of the time modulation generator 10 (other than the very small opposing pulses at null). This is accomplished by means of logic circuits in FIGURE 1. An output pulse at point B also appears at a junction 50 where it is connected through a resistor 52 to the base of a transistor 54. This transistor is normally biased just short of conduction, and the presence of the pulse at junction 50 increases the voltage on the base of transistor 54, thereby causing it to conduct. This conduction effectively grounds point D and a junction 56 where any simultaneous signal of opposite polarity to that appearing at point B would appear.

An analogous arrangement operates when a pulse first appears at point D and junction 56. This pulse is connected through a resistor 58 to the base of a transistor 60 which is normally biased just short of conduction and which conducts when the pulse appears. Conduction of transistor 60 effectively grounds junction 50 and therefore any signal appearing at this junction. The signal first appearing at points B or D controls the polarity of the output signal.

A similar inhibit circuit arrangement is shown which may be used, if desired, to ground the input pulses when the motor reaches a desired limit of rotation. This limit may be any value, depending upon the particular application. In the device with which applicants are concerned, this limit is set at 30 degrees in either direction. Such rotation causes a switch (not shown) to be closed at either limit, one of which connects a biasing signal to a terminal 62, through a resistor 64 to initiate conduction of a transistor 66, thus grounding any pulse appearing at junction 50, and the other providing a biasing signal to a terminal 68, through a resistor 70 to initiate conduction of a transistor 72 which grounds any output appearing at junction 56. This circuit conducts only signals which will drive the motor out of the limit.

Figure 2:
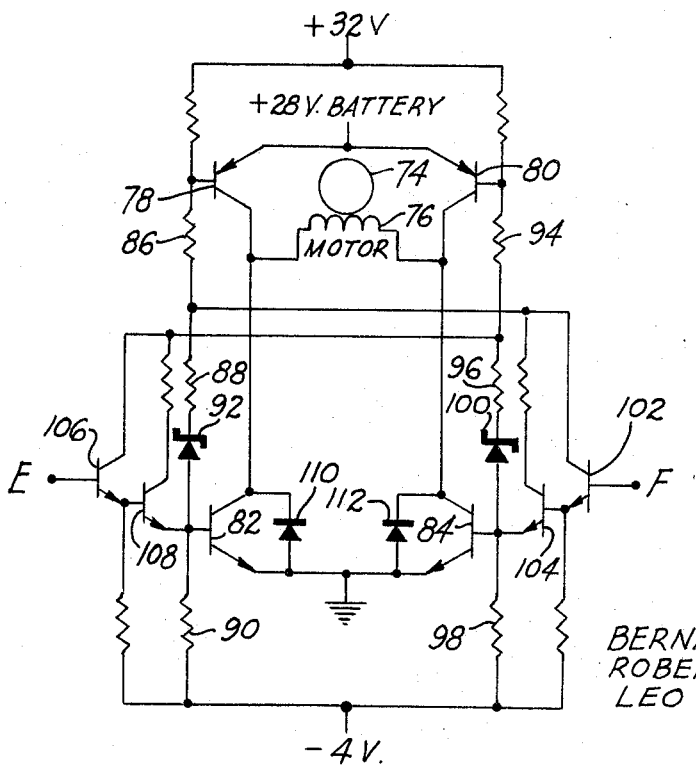
FIGURE 2 is a schematic diagram of the semiconductor power switch section of our motor control system.

The actuator power switch for controlling the rotation of the motor 74 is shown in FIGURE 2. The winding 76 is connected across what is effectively a bridge circuit with the main power source being a battery, in this case shown as 28 volts, with an additional slightly higher bias voltage source (32 volts) which may be supplied from additional cells of the same battery. It is desired that the main battery voltage (28 volts) be applied across the motor winding 76 in either direction. A first pair of transistors 78 and 80 are connected to the motor winding 76 and are biased by means of the higher voltage (32 volts) such that, in the absence of an input pulse at input points E or F, they do not conduct. Under these conditions a second pair of transistors 82 and 84 are biased on because the values of resistors 86, 88, 90 and the voltage drop across the Zener diode 92 are chosen to hold the base of transistor 82 sufficiently above ground that it conducts. Transistor 84 is biased to conduction in a manner analogous to transistor 82. With transistors 82 and 84 both conducting and transistors 78 and 80 not conducting, it is apparent that no significant voltage appears across the motor winding 76 and there are no bucking or opposing voltages across this winding. Any voltages which might be induced into winding 76 of either polarity are grounded through transistors 82 and 84. Thus the motor is always placed in the same condition after the removal of an input signal which it would have when initially energized, and any voltages induced from any residual magnetism effects or back electromotive forces which would tend to reduce the starting torque when the next chain of input pulses arrives are eliminated. This also serves to ground any electrical charges which might otherwise tend to demagnetize the permanent magnet of the motor 74.

When a pulse signal arrives from the time modulation generator at point F, it appears at the base of a transistor 102, biasing it to conduction, and therefore supplying pulses to the bases of transistors 78 and 104. Because of the voltage inversion produced by transistor 102, this input appears as a sharp negative-going pulse at the base of transistor 78 which causes this transistor, which is a PNP transistor, to conduct. The negative-going pulse causes the voltage to be lowered all along the chain of resistors 86, 88, diode 92 and resistor 90 such that the bias on the base of transistor 82 is lowered sufficiently that it is turned off. This causes the motor winding 76 to be connected directly across the 28-volt battery since conduction is through transistor 78, winding 76, and transistor 84 to ground. Similarly, an input signal at point E will initiate conduction of transistor 106 and therefore transistor 108, which causes a substantial negative-going pulse to appear at the base of transistor 80, thus overcoming the normally positive bias and causing PNP transistor 80 to conduct. This negative voltage pulse will result in lowering the voltage at the base of transistor 84, and this transistor is turned off. The full 28-volt battery voltage is now connected through transistor 80, motor winding 76 in the opposite direction to that described above, and through transistor 82 to ground.

From the foregoing it will be appreciated that inhibit circuits are necessary to provide positive assurance that input signals do not appear simultaneously at points E and F, since this would result in turning on all transistors at the same time, causing the battery to be short-circuited to ground. The diodes 110 and 112 provide protection for transistors 82 and 84. At the time of switching either of these transistors off, there can be transients from the motor of sufficient magnitude to damage the transistors, and these transients are connected to ground through diodes 110 and 112. In addition, these diodes are used to assure that if the motor is at full speed and there is no input from either E or F, maximum braking of the motor will occur since the motor winding will be shorted through these units. Transistors 104 and 108 are provided to increase the base drive of transistors 84 and 82, respectively, to assure that maximum motor current at stall can be obtained. The Zener diodes 92 and 100 operate in their respective resistance chains to provide some voltage drop without adding substantial resistance. If resistors were substituted at these points, under some situations it would not be possible to turn off transistors 82 and 84.

The use of the triangular wave reference frequency instead of another waveform such as the sawtooth wave commonly used provides for a displacement in time of the pulses in one direction versus the other direction by half the basic oscillator period. A sawtooth waveform in this application, although it might provide a satisfactorily linear response, would permit no displacement between the pulses, thus requiring all of the output switches to change state simultaneously since the positive and negative peaks are not displaced from each other in time.

While only a single embodiment has been shown and described herein, it is recognized that modifications may be made within the spirit and scope of the present invention, and we do not desire to be limited to the specific embodiment disclosed or otherwise than by the scope of the following claims.

We claim:
1. A controller for a reversible direct current motor having an exciting winding, comprising a direct current voltage source;
   a normally nonconducting transistor connected between each side of said motor winding and said voltage source;
   a normally conducting transistor connected between each side of said motor winding and ground;
   a first input transistor connected to one of said normally nonconducting transistors which, when it produces an output signal, turns said normally nonconducting transistor on which results in turning one of said normally conducting transistors off such that said source is effectively connected directly across said motor winding in a first direction;
   a second input transistor connected to the other of said normally nonconducting transistors which, when it produces an output signal, turns said other normally nonconducting transistor on which results in turning the other of said normally conducting transistors off such that said source is effectively connected directly across said motor winding in a second direction;
   an oscillator for producing an alternating current output whose positive and negative peaks are displaced in time;
   pulse generator means for receiving said oscillator output and normally biased to produce an output pulse of each polarity and of very short duration concurrently with each of said positive and negative peaks;
   means for receiving direct current input signals of either polarity for effectively varying the bias on said pulse-generating means such that said pulse-generating means produces output pulses whose polarity varies with the polarity of said input signals and whose pulse width varies with the magnitude of said input signals, said input signal receiving means including separate channels for each polarity of said output pulses and circuit logic means are included which are connected between said channels, said logic means responding to the presence of an output pulse in one of said channels by connecting the output of the other of said channels to ground; and
   means connecting said output pulses of one polarity to said first input transistor and means connecting said output pulses of the opposite polarity to said second input transistor.

2. A controller for a reversible direct current motor having an exciting winding, comprising a direct current voltage source;
   a normally nonconducting transistor connected between each side of said motor winding and one side of said source;
   a normally conducting transistor connected between each side of said motor winding and ground;
   a first input transistor connected to one of said normally nonconducting transistors which, when it produces an output signal, turns said normally nonconducting transistor on and turns one of said normally conducting transistors off such that said source is connected across said winding in a first direction;
   a second input transistor connected to the other of said normally nonconducting transistors which, when it produce an output signal, turns said other normally nonconducting transistor on and the other of said normally conducting transistors off, such that said source is effectively connected directly across said winding in a second direction;
   an oscillator producing a triangular output wave;
   pulse generator means for receiving said oscillator output and biased to produce output pulses of each polarity and of very short duration concurrently with each of said positive and negative peaks;
   means for receiving direct current input signals of either polarity for effectively varying the bias on said pulse-generating means such that said pulse-generating means produces output pulses whose polarity varies with the polarity of said input signals and whose pulse width is substantially directly proportional to the magnitude of said input signals, said input signal receiving means including separate channels for each polarity of said output pulses and circuit logic means are included which are connected between said channels, said logic means responding to the presence of an output pulse in one of said channels by connecting the output of the other of said channels to ground; and
   means connecting said output pulses of one polarity to said first input transistor and means connecting said output pulses of the opposite polarity to said second input transistor.

3. A controller for a reversible direct current motor as set forth in claim 2 wherein said logic means includes a normally nonconducting semiconductor device connected between the output of each of said channels and ground and connections are provided from the output of the opposite channel to said semiconductor devices such that an output pulse in one of said channels causes conduction of the one of said semiconductor devices connected in the opposite output channel, thus grounding said opposite output channel.

4. A controller for a reversible direct current motor as set forth in claim 2 wherein additional circuit logic means are included which respond to rotation of said motor to a predetermined position by producing an output which connects the output of one of said channels to ground.

5. A controller for a reversible direct current motor as set forth in claim 1 wherein said logic means includes a normally nonconducting semiconductor device connected between the output of each of said channels and ground and connections are provided from the output of the opposite channel to said semiconductor devices such that an output pulse in one of said channels causes conduction of the one of said semiconductor devices connected in the opposite output channel, thus grounding said opposite output channel.

6. A controller for a reversible direct current motor as set forth in claim 1 wherein additional circuit logic means are included which respond to rotation of said motor to a predetermined position by producing an output which connects the output of one of said channels to ground.

7. A controller for applying current to a reversible direct current motor in response to a variable direct current signal comprising:

means for generating a substantially constant frequency signal of triangular wave form;

means combining said constant frequency signal with said direct current signal to provide first and second alternately occurring output signals which vary in magnitude with variations in magnitude of said direct current signal, means including first and second channels connected to receive said first and second output signals and to produce first and second output pulse trains, the pulses of which vary in duration in proportion to the magnitude of said first and second output signals respectively, and logic means responding to the presence of an output pulse in one of said channels by connecting the output of the other of said channels to ground;

a source of energy;

controlled switching means connecting said source to said motor and actuable to provide first and second energy paths of opposite direction across said motor; and means operatively connected to actuate said switching means to provide said first path in response to pulses of said first pulse train and to provide said second path in response to pulses of said second pulse train.

8. A controller as defined in claim 7 wherein said logic means includes a normally nonconducting semiconductor device connected between the output of each of said channels and ground and connections are provided from the output of the opposite channel to said semiconductor devices such that an output pulse in one of said channels causes conduction of the one of said semiconductor devices connected in the opposite output channel, thus grounding said opposite output channel.

References Cited

UNITED STATES PATENTS

| | | | |
|---|---|---|---|
| 3,110,851 | 11/1963 | Plogstedt et al. | 318—257 |
| 3,233,161 | 2/1966 | Sikorra | 318—257 |
| 3,260,912 | 7/1966 | Gregory | 318—341 |

ORIS L. RADER, Primary Examiner

K. L. CROSSON, Assistant Examiner

U.S. Cl. X.R.

318—294, 341